United States Patent Office 2,930,782
Patented Mar. 29, 1960

2,930,782

PREPARATION OF RESINS

Louis Schmerling, Riverside, Ill., assignor, by mesne assignments, to Universal Oil Products Company, Des Plaines, Ill., a corporation of Delaware No Drawing. Application September 30, 1957
Serial No. 686,878

16 Claims. (Cl. 260—88.2)

This invention relates to a process for preparing novel resins and particularly to a process for preparing resins by reacting a bicyclic compound with an olefin. More particularly this invention relates to the use of norbornadiene as a starting material in the preparation of resins.

An object of this invention is to prepare novel resins by reacting a bicyclic compound with an olefin.

A further object of this invention is to prepare resins by reacting norbornadiene with an olefin in the presence of a free radical generating catalyst.

One embodiment of the invention resides in a process for the preparation of a resin by reacting norbornadiene with an olefin selected from the group consisting of aliphatic and cyclic olefins in the presence of a peroxy compound catalyst, said process being carried out at a condensation temperature at least as high as the decomposition temperature of the catalyst, and recovering the resultant resin.

Another embodiment of the invention resides in a process for the preparation of a resin by reacting norbornadiene with ethylene in the presence of a peroxy compound catalyst, said process being carried out at a condensation temperature at least as high as the decomposition temperature of the catalyst and at a pressure such that a substantial portion of the reactants is in the liquid phase, and recovering the resultant resin.

Yet another embodiment of the invention is found in a process for the preparation of a resin which comprises reacting norbornadiene with an olefin in the presence of di-t-butyl peroxide, said process being carried out at a condensation temperature at least as high as the decomposition temperature of said catalyst and at a pressure such that a substantial portion of the reactants is in the liquid phase, and recovering the resultant resin.

A specific embodiment of the invention is found in a process for the preparation of a resin by reacting norbornadiene with ethylene in the presence of di-t-butyl peroxide at a temperature in the range of from about 130° to about 140° C. and at a pressure in the range of from about 30 to about 70 atmospheres, and recovering the resultant resin.

Other objects and embodiments referring to alternative olefins and peroxy compound catalysts will be found in the following further detailed description of the invention.

It has now been discovered that resins or resinous material may be prepared by reacting an unsaturated bicyclic compound such as norbornadiene with an olefin. The physical properties of the resinous materials formed by the process of this invention are varied according to the particular unsaturated compound which is used in the reaction. The aforesaid resinous material will find a wide variety of uses in many phases of everyday life, an important use of which is as a coating for various objects, especially in the electrical field. In addition, some resins formed by the process of this invention may be molded into various shapes by the application of heat and pressure and thus used per se. Another use of a resinous material of the present invention is as a packing material.

Suitable unsaturated hydrocarbons which may be used include aliphatic olefins such as ethylene, propylene, butene-1, butene-2, isobutylene, pentene-1, pentene-2, pentene-3, 2-methyl-2-butene, hexene-1, hexene-2, hexene-3, 2-methyl-1-hexene, 3-methyl-1-hexene, 4-methyl-1-hexene, 5-methyl-1-hexene, 2-methyl-2-hexene, 3-methyl-2-hexene, 4-methyl-2-hexene, 5-methyl-2-hexene, 2-methyl-3-hexene, 3-methyl-3-hexene, heptene-1, heptene-2, heptene-3, heptene-4, etc., the octenes, nonenes, decenes, etc.; cycloolefins including cyclopentene, cyclohexene, cycloheptene, etc.; alkyl cycloolefins such as 1-methyl-1-cyclopentene, 3-methyl-1-cyclopentene, 4-methyl-1-cyclopentene, 1-ethyl-1-cyclopentene, 3-ethyl-1-cyclopentene, 4-ethyl-1-cyclopentene, 1-methyl-1-cyclohexene, 3-methyl-1-cyclohexene, 4-methyl-1-cyclohexene, 1-ethyl-1-cyclohexene, 3-ethyl-1-cyclohexene, 4-ethyl-1-cyclohexene, 1-propyl-1-cyclopentene, 1-propyl-1-cyclohexene, 1-butyl-1-cyclopentene, 1-butyl-1-cyclohexene, etc.

The catalysts which may be used in the present process are those which are capable of forming free radicals under the reaction conditions. These include peroxy compounds containing the bivalent radical —O—O—, and which are capable of inducing the condensation of norbornadiene with the aforementioned olefins. The organic peroxy compounds constitute a preferred class of catalyst for use in this invention and include peracetic acid, persuccinic acid, dimethyl peroxide, diethyl peroxide, dipropyl peroxide, di-t-butyl peroxide, butyryl peroxide, lauroyl peroxide, benzoyl peroxide, tetralin peroxide, urea peroxide, t-butyl perbenzoate, etc. Other catalysts which may be used are the persulfates, perborates and percarbonates of ammonium and the alkali metals, etc., as well as mixtures of the peroxy compounds. Only catalytic amounts, less than the stoichiometric amount, need be used in this process.

The reaction temperature employed in the process of this invention should be at least as high as the initial decomposition temperature of the free radical generating catalyst, such as a peroxide compound, in order to liberate and form free radicals which promote the reaction. However, the operating temperatures generally do not exceed the decomposition temperature of the catalyst by more than about 150° C. In the continuous method of carrying out this process, the catalysts preferably are added continuously to the reaction zone, but, if desired, catalyst may be added intermittently, particularly when a packing material is used which retains the catalyst in the reaction zone. When a free radical generating catalyst such as t-butyl perbenzoate is used, having a decomposition temperature of approximately 115° C., the operating temperature of the process is from about 115° C. to about 265° C. When a di-t-butyl peroxide having a decomposition temperature of about 130° C. is used, the process is run at a temperature of from about 130° C. to about 230° C. Higher reaction temperatures may be employed, but little advantage is gained if the temperature is more than the hereinbefore mentioned 150° C. higher than the decomposition temperature of the catalyst. The general effect of increasing the operating temperature is to accelerate the rate of the condensation reaction between the polyhalo-olefins and the ether. However, the increased rate of reaction is accompanied by certain amounts of decomposition. The preferred operating pressure of the process is that needed to keep a substantial portion of the reactants in a liquid phase.

Concentration of the catalyst employed in this process may also vary over a rather wide range but it is desirable to use low concentrations of catalysts such as from about 0.1% to about 10% of the total weight of the olefin and the norbornadiene charged to this process. The reaction time of the process may be within the range of from slightly less than one minute to several hours. However, contact times of at least 10 minutes are usually preferred.

The process of this invention may be effected in any suitable manner and may comprise either a batch or a continuous type operation. When a batch type operation is used a quantity of the norbornadiene and the catalyst is placed in an appropriate apparatus such as a rotating autoclave. If the olefin used in the preparation of the resin is gaseous in nature the autoclave is sealed and the olefin charged thereto, after which the apparatus is heated to the desired reaction temperature. If, however, the olefin is liquid in nature it may be added along with the norbornadiene and the peroxy compound catalyst before the autoclave is sealed and heated to the reaction temperature. After a suitable period of time has elapsed the reactor and the contents thereof are cooled to room temperature and the condensation product is recovered by conventional means, for example, by fractional distillation, crystallization, separation, etc.

Another method of operation of the present process, which constitutes the preferred method of operation, is of the continuous type. In this method of operation the norbornadiene, the olefin and the peroxy compound catalyst are continuously charged to a reaction zone which is maintained at the suitable operating conditions of temperature and pressure. The reaction zone may comprise an unpacked vessel or coil or it may be lined with an adsorbent packing material such as fire brick, alumina, dehydrated bauxite and the like. As hereinbefore stated the reactants and the catalyst may be charged to the reactor through separate lines or, if so desired, two or more of the aforementioned compounds may be admixed prior to entry into said reactor and charged thereto in a single line. After completion of the desired residence time the condensation products are continuously withdrawn and separated from the reactor effluent, the unconverted materials may then be recycled to the reaction zone to form a portion of the starting material while the desired product is purified and recovered by conventional means hereinbefore set forth.

A modification of the above mentioned process of adding the free radical generating catalyst to the reaction zone is found in the process of forming a catalyst in situ in the norbornadiene and then charging the resultant solution to the reaction zone together with the aliphatic or cyclic olefins. Formation of the peroxy compound catalyst in the norbornadiene may be accomplished by autooxidation, for example, by heating the compound while air is bubbling therethrough, preferably in the presence of a trace of the oxide formed in the presence of a previous autooxidation. Alternately, the air may be passed through the compound in the presence of an oxidation catalyst such as manganese stearate. In continuous methods of operation of carrying out this operation the catalysts are preferably added continuously to the reaction zone, but if desired, they may be added intermittently.

The following examples are given to illustrate the process of the present invention, which, however, are not intended to limit the generally broad scope of the present invention in strict accordance therewith.

*Example I*

Twenty grams of norbornadiene and 5 grams of di-t-butyl peroxide were placed in a glass liner of a rotating autoclave having an 850 cc. capacity. The glass liner was placed in the autoclave and sealed, after which ethylene was charged thereto until an initial ethylene pressure of 40 atmospheres had been reached. The autoclave was then heated to a temperature of from about 130° to about 140° C. and maintained thereat for a period of about 3 hours during which time the maximum pressure reached 69 atmospheres. At the end of the aforementioned 3 hours the autoclave and contents thereof were cooled to room temperature, the final pressure at room temperature being 37 atmospheres. Twenty-six grams of reaction product consisting of an amber solid plus a tacky, viscous product was recovered from the liner. The product was extracted with pentane leaving 18 g. of solid product. In addition, the pentane solvent was evaporated and a glass-like residue remained.

*Example II*

Twenty grams of norbornadiene and 5 g. of t-butyl perbenzoate are placed in the glass liner of a rotating autoclave. The liner is placed in the autoclave and sealed after which butylene is pressured in until an initial pressure of 40 atmospheres has been reached. The autoclave is then heated to a temperature of from about 130° to about 140° C. and maintained thereat for a period of about 3.5 hours. At the end of this time the autoclave and contents thereof are cooled to room temperature and the reaction product, comprising an amber solid is separated and recovered.

*Example III*

Twenty grams of norbornadiene and 5 g. of benzoyl peroxide are placed in an apparatus similar to that described in Examples I and II above. The apparatus is sealed and propylene pressured in, after which the apparatus is heated to a temperature of from about 130° to about 140° C. At the end of the desired reaction time the apparatus is cooled and the reaction product, comprising an amber solid, is separated out and recovered.

I claim as my invention:

1. A process for the preparation of a resin which comprises reacting norbornadiene with an olefin selected from the group consisting of aliphatic and cyclic olefins in the presence of a peroxy compound catalyst, said process being carried out at a condensation temperature at least as high as the decomposition temperature of the catalyst, and recovering the resultant resin.

2. A process for the preparation of a resin which comprises reacting norbornadiene with an olefin selected from the group consisting of aliphatic and cyclic olefins in the presence of an organic peroxide catalyst, said process being carried out at a condensation temperature at least as high as the decomposition temperature of the catalyst and at a pressure such that a substantial portion of the reactants is in the liquid phase, and recovering the resultant resin.

3. A process for the preparation of a resin which comprises reacting norbornadiene with an aliphatic olefin in the presence of an organic peroxide catalyst, said process being carried out at a condensation temperature at least as high as the decomposition temperature of the catalyst and at a pressure such that a substantial portion of the reactants is in the liquid phase, and recovering the resultant resin.

4. A process for the preparation of a resin which comprises reacting norbornadiene with a cyclic olefin in the presence of an organic peroxide catalyst, said process being carried out at a condensation temperature at least as high as the decomposition temperature of the catalyst and at a pressure such that a substantial portion of the reactants is in the liquid phase, and recovering the resultant resin.

5. A process for the preparation of a resin which comprises reacting norbornadiene with ethylene in the presence of an organic peroxide catalyst, said process being carried out at a condensation temperature at least as high as the decomposition temperature of the catalyst and at pressure such that a substantial portion of the reactants is in the liquid phase, and recovering the resultant resin.

6. A process for the preparation of a resin which comprises reacting norbornadiene with propylene in the presence of an organic peroxide catalyst, said process being carried out at a condensation temperature at least as high as the decomposition temperature of the catalyst and at a pressure such that a substantial portion of the reactants is in the liquid phase, and recovering the resultant resin.

7. A process for the preparation of a resin which comprises reacting norbornadiene with butylene in the presence of an organic peroxide catalyst, said process being carried out at a condensation temperature at least as high as the decomposition temperature of the catalyst and at a pressure such that a substantial portion of the reactants is in the liquid phase, and recovering the resultant resin.

8. A process for the preparation of a resin which comprises reacting norbornadiene with cyclopentene in the presence of an organic peroxide catalyst, said process being carried out at a condensation temperature at least as high as the decomposition temperature of the catalyst and at a pressure such that a substantial portion of the reactants is in the liquid phase, and recovering the resultant resin.

9. A process for the preparation of a resin which comprises reacting norbornadiene with methylcyclohexene in the presence of an organic peroxide catalyst, said process being carried out at a condensation temperature at least as high as the decomposition temperature of the catalyst and at a pressure such that a substantial portion of the reactants is in the liquid phase, and recovering the resultant resin.

10. A process for the preparation of a resin which comprises reacting norbornadiene with an olefin selected from the group consisting of aliphatic and cyclic olefins in the presence of di-t-butyl peroxide, said process being carried out at a condensation temperature at least as high as the decomposition temperature of said catalyst and at a pressure such that a substantial portion of the reactants is in the liquid phase, and recovering the resultant resin.

11. A process for the preparation of a resin which comprises reacting norbornadiene with an olefin selected from the group consisting of aliphatic and cyclic olefins in the presence of t-butyl perbenzoate, said process being carried out at a condensation temperature at least as high as the decomposition temperature of said catalyst and at a pressure such that a substantial portion of the reactants is in the liquid phase, and recovering the resultant resin.

12. A process for the preparation of a resin which comprises reacting norbornadiene with an olefin selected from the group consisting of aliphatic and cyclic olefins in the presence of benzoyl peroxide, said process being carried out at a condensation temperature at least as high as the decomposition temperature of said catalyst and at a pressure such that a substantial portion of the reactants is in the liquid phase, and recovering the resultant resin.

13. A process for the preparation of a resin which comprises reacting norbornadiene with an olefin selected from the group consisting of aliphatic and cyclic olefins in the presence of butyryl peroxide, said process being carried out at a condensation temperature at least as high as the decomposition temperature of said catalyst and at a pressure such that a substantial portion of the reactants is in the liquid phase, and recovering the resultant resin.

14. A process for the preparation of a resin which comprises reacting norbornadiene with ethylene in the presence of di-t-butyl peroxide at a temperature in the range of from about 130° to about 140° C. and at a pressure in the range of from about 30 to about 70 atmospheres, and recovering the resultant resin.

15. A process for the preparation of a resin which comprises reacting norbornadiene with propylene in the presence of benzoyl peroxide at a temperature in the range of from about 130° to about 140° C. and at a pressure in the range of from about 10 to about 30 atmospheres, and recovering the resultant resin.

16. A process for the preparation of a resin which comprises reacting norbornadiene with butylene in the presence of t-butyl perbenzoate at a temperature in the range of from about 130° to about 140° C. and at a pressure in the range of from about 10 to about 30 atmospheres, and recovering the resultant resin.

References Cited in the file of this patent

UNITED STATES PATENTS 2,348,565    Ott                    May 9, 1944

FOREIGN PATENTS 498,176    Belgium              Jan. 15, 1951
777,414    Great Britain         June 19, 1957

OTHER REFERENCES

Schmerling, JACS, vol. 78, June 1956 (pages 2819–2821).